United States Patent
Keskin et al.

(10) Patent No.: US 10,397,484 B2
(45) Date of Patent: Aug. 27, 2019

(54) CAMERA ZOOM BASED ON SENSOR DATA

(71) Applicant: QUALCOMM Incorporated, San Diego, CA (US)

(72) Inventors: Mustafa Keskin, San Diego, CA (US); Salih Dikbas, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/861,841

(22) Filed: Sep. 22, 2015

(65) Prior Publication Data

US 2017/0048462 A1 Feb. 16, 2017

Related U.S. Application Data

(60) Provisional application No. 62/205,301, filed on Aug. 14, 2015.

(51) Int. Cl.
*H04N 5/232* (2006.01)
*G06T 7/80* (2017.01)
*G03B 5/00* (2006.01)

(52) U.S. Cl.
CPC ........... *H04N 5/23296* (2013.01); *G06T 7/80* (2017.01); *G03B 5/00* (2013.01); *G03B 2205/0046* (2013.01)

(58) Field of Classification Search
CPC .............. G03B 17/00; H04N 5/23216; H04N 5/23296; G06T 7/80
USPC ........................................................ 348/340
See application file for complete search history.

(56) References Cited

U.S. PATENT DOCUMENTS

| 4,942,417 | A | 7/1990 | Miyazawa et al. |
| 7,193,645 | B1 * | 3/2007 | Aagaard ................ H04N 5/222 348/157 |
| 7,330,607 | B2 | 2/2008 | Jung et al. |
| 7,742,085 | B2 | 6/2010 | Shin |
| 8,089,518 | B2 | 1/2012 | Fahn et al. |
| 8,858,100 | B2 | 10/2014 | Pavithran et al. |

(Continued)

FOREIGN PATENT DOCUMENTS

WO 2008117141 A1 10/2008

OTHER PUBLICATIONS

International Search Report and Written Opinion—PCT/US2016/042264—ISA/EPO—dated Oct. 4, 2016.

*Primary Examiner* — Cynthia Segura
(74) *Attorney, Agent, or Firm* — Polsinelli LLP

(57) ABSTRACT

A method, an apparatus, and a computer program product for a camera zoom function are provided. The method includes associating a camera zoom with at least one sensor, detecting a physical characteristic of the camera with the at least one sensor, and adjusting the camera zoom based on the detected physical characteristic of the camera. The detecting the physical characteristic and the adjusting the camera zoom are continuous. An apparatus is provided and includes a camera, a memory, and at least one processor coupled to the memory. The at least one processor is configured to associate a camera zoom with at least one sensor, detect a physical characteristic of the camera with the at least one sensor, and adjust the camera zoom based on the detected physical characteristic of the camera. The detecting the physical characteristic and the adjusting the camera zoom are continuous.

24 Claims, 7 Drawing Sheets

(56) References Cited

U.S. PATENT DOCUMENTS

| | | | |
|---|---|---|---|
| 2003/0001863 A1* | 1/2003 | Davidson | G06F 1/1626 345/619 |
| 2003/0210329 A1* | 11/2003 | Aagaard | H04N 7/181 348/159 |
| 2005/0041111 A1* | 2/2005 | Matsuoka | H04N 5/23296 348/207.99 |
| 2005/0212767 A1* | 9/2005 | Marvit | G06F 1/1626 345/158 |
| 2006/0017692 A1* | 1/2006 | Wehrenberg | G06F 1/1616 345/156 |
| 2006/0164382 A1* | 7/2006 | Kulas | G06F 1/1626 345/156 |
| 2006/0181510 A1* | 8/2006 | Faith | G06F 1/1626 345/158 |
| 2008/0084473 A1* | 4/2008 | Romanowich | G08B 13/19671 348/135 |
| 2008/0240698 A1* | 10/2008 | Bartilson | G03B 13/12 396/78 |
| 2009/0089705 A1* | 4/2009 | Panabaker | G06F 3/0485 715/784 |
| 2009/0228841 A1* | 9/2009 | Hildreth | G06F 3/0304 715/863 |
| 2010/0125816 A1* | 5/2010 | Bezos | G06F 1/1626 715/863 |
| 2012/0105572 A1 | 5/2012 | Sammon | |
| 2012/0154599 A1* | 6/2012 | Huang | H04N 5/232 348/169 |
| 2012/0212623 A1* | 8/2012 | Cho | G05D 1/0246 348/169 |
| 2012/0281119 A1* | 11/2012 | Ohba | H04N 9/8205 348/240.2 |
| 2014/0009632 A1* | 1/2014 | Glover | H04N 5/232 348/211.99 |
| 2014/0139667 A1 | 5/2014 | Kang | |
| 2015/0029347 A1 | 1/2015 | Tsubusaki | |
| 2015/0244927 A1* | 8/2015 | Laroia | H04N 5/23212 348/240.99 |
| 2015/0248783 A1* | 9/2015 | Fayle | G06T 19/006 345/633 |
| 2015/0281587 A1* | 10/2015 | Furuta | B60R 1/00 348/240.2 |
| 2016/0021315 A1* | 1/2016 | Tsubusaki | H04N 5/23216 348/240.1 |
| 2016/0127695 A1* | 5/2016 | Zhang | H04N 5/23206 348/143 |
| 2016/0142625 A1* | 5/2016 | Weksler | H04N 5/23222 348/222.1 |
| 2016/0366394 A1* | 12/2016 | Park | H04N 13/239 |
| 2017/0248948 A1* | 8/2017 | Otani | G06T 7/70 |

* cited by examiner

CAMERA ZOOM BASED ON SENSOR DATA

CROSS-REFERENCE TO RELATED APPLICATION(S)

This application claims the benefit of U.S. Provisional Application Ser. No. 62/205,301, entitled "CAMERA ZOOM BASED ON SENSOR DATA" and filed on Aug. 14, 2015, which is expressly incorporated by reference herein in its entirety.

BACKGROUND

Field

The present disclosure relates generally to apparatuses with cameras, and more particularly, to methods and apparatuses that provide automatic control of a zoom function of a camera.

Background

A camera may capture still images and/or video of an object and may provide a zoom function to enlarge or reduce the sizes of the object images. The zoom function may be implemented with, for example, an optical zoom or a digital zoom. A camera with optical zoom may physically move the camera lenses to adjust a distance thereof to enlarge or to reduce the size of an image. A camera with digital zoom may enlarge or reduce the size of the image via processing of image data. For example, the camera may utilize a processor to adjust the captured image data to achieve the zoom function without physically moving the lenses.

In small digital cameras of mobile communication terminals, it may be difficult to implement an automatic focus controlling function using a hardware distance measuring device due to size limitations. A design focus is to improve the camera zoom function and the associated user experience.

SUMMARY

In an aspect of the disclosure, a method, a computer program product, and an apparatus are provided. The method includes associating a camera zoom with at least one sensor, detecting a physical characteristic of the camera with the at least one sensor, and adjusting the camera zoom based on the detected physical characteristic of the camera. The detecting the physical characteristic and the adjusting the camera zoom are continuous.

The apparatus includes a camera, a memory, and at least one processor coupled to the memory. The at least one processor is configured to associate a camera zoom with at least one sensor, detect a physical characteristic of the camera with the at least one sensor, and adjust the camera zoom based on the detected physical characteristic of the camera. The detection of the physical characteristic and the adjustment of the camera zoom are continuous.

The computer program product includes computer-readable medium storing computer executable code for: associating a camera zoom of a camera with at least one sensor, detecting a physical characteristic of the camera with the at least one sensor, and adjusting the camera zoom based on the detected physical characteristic of the camera. The detection of the physical characteristic and the adjustment of the camera zoom are continuous.

In another aspect, the apparatus includes a camera, means for associating a camera zoom of the camera with at least one sensor, means for detecting a physical characteristic of the camera with the at least one sensor, and means for adjusting the camera zoom based on the detected physical characteristic of the camera. The means for detecting the physical characteristic and the means for adjusting the camera zoom are configured to operate continuously.

DETAILED DESCRIPTION

Figure 1:
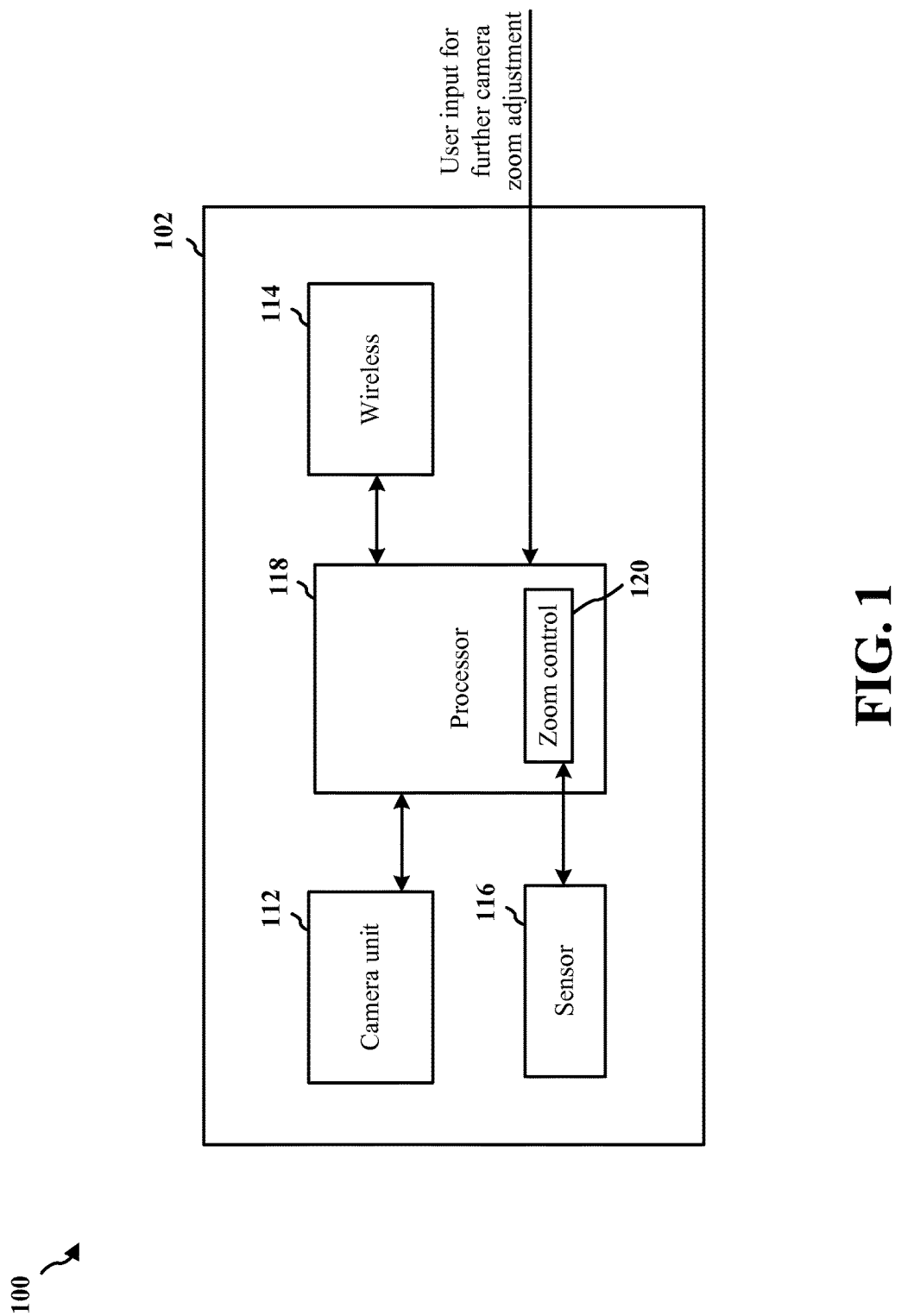
FIG. 1 is a conceptual diagram of an exemplary apparatus with a camera zoom function that at least partially operates based on sensor data.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of camera systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Various aspects of apparatuses and methods for a camera zoom function based on sensor data will be presented with respect to a wireless device, such as a cell phone, equipped with a camera. However, as those skilled in the art will readily appreciate, the various aspects of the camera zoom function based on sensor data presented throughout this disclosure and their numerous applications are not limited to the exemplary embodiments. For example, the aspects presented may be applicable to apparatuses beyond a wireless device (e.g., a digital camera with or without wireless communication capabilities). Accordingly, all references to a specific application for the presented apparatus or method are intended only to illustrate exemplary aspects of the apparatus or method with the understanding that such aspects may have a wide differential of applications.

FIG. 1 is a conceptual diagram 100 of an exemplary apparatus 102 with a camera zoom function that at least partially operates based on sensor data. The apparatus 110 may be, for example, a cell phone, a tablet computer, or a camera with wireless communication capability. The apparatus 110 may include a camera unit 112, a wireless module 114, a sensor 116, and a processor 118. The processor 118 further includes a zoom control 120. In some examples, a camera zoom may refer to an act of adjusting a zoom or magnification of the image captured by apparatus 102, a zoom setting may refer to a value or quantity by which a size of a captured image is enlarged or reduced, and a camera zoom function may refer to the various operations to perform the camera zoom.

The camera unit 112 may include, for example, camera lenses and may operate to take images and/or videos of an object. The camera unit 112 may be configured with a zoom function (e.g., optical zoom). For example, the camera unit 112 may include lenses and mechanisms (e.g., actuators) to adjust a distance between the lenses for the zoom function. Such operations for the zoom function may be controlled or enabled by the processor 118.

The wireless module 114 may include, for example, an antenna for transmitting and receiving wireless signaling and circuits for processing transmission data and for processing data received via the antenna. The transmission data may be provided by and the received data may be provided to the processor 118.

Examples of the wireless communication via the wireless module 114 may include various telecommunication services such as telephony, video, data, messaging, and broadcasts. Moreover, the wireless transmitting and receiving of signals may be under various telecommunication standards. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

The sensor 116 may detect, for example, physical characteristics of the apparatus 102 and provide detected sensor data to the processor 118. In some configurations, the sensor 116 may detect or sense the location and/or rotation (e.g., an angle or location with respect to a reference angle or location) of the apparatus 102. For example, the detected location may be in reference to an object captured by the apparatus 102 or to a field of view of the apparatus 102. In some examples, the sensor 116 may detect or sense an activity or movement of the apparatus 102, the location and/or rotation may be based on the detected activity or movement. Examples of the sensor 116 are provided in further detail below.

In some examples, the sensor 116 may include accelerometers that measure linear acceleration and/or rotation angle of the apparatus 102. Single and multi-axis accelerometers may detect the combined magnitude and direction of the linear and gravitational acceleration of the apparatus 102, and may be used to provide motion sensing functionality.

In some examples, the sensor 116 may include gyroscopes that measure the angular rate of rotation of the apparatus 102 about one or more axes. Some of the measured rotations may be known as tilt. Gyroscopes may measure complex motions accurately in free space, and hence, making the gyroscopes a desired motion sensor for tracking the position and rotation of a moving object such as the apparatus 102.

In some examples, the sensor 116 may include digital compasses (e.g., eCompasses) that detect heading of the apparatus 102 based on the Earth's magnetic field. Consumer electronics applications for digital compasses may include correctly orienting a down-loaded map on a mobile screen or providing basic heading information for navigation applications on the apparatus 102. In some examples, the sensor 116 may include pressure sensors that measure relative and absolute altitude of the apparatus 102 through the analysis of changes in the atmospheric pressure.

In some examples, the sensor 116 may include inertia sensors. The inertia sensors typically include microelectromechanical systems or MEMS. In some examples, the inertia sensors may utilize the outputs of the accelerometers and gyroscopes to produce a three-dimensional measurement of force and angular rate of the apparatus 102. In some examples, the apparatus 102 may adjust the camera zoom based on a physical characteristic of the apparatus 102 detected by the sensor 116. The physical characteristic may include a location and/or rotation based on an activity or movement of the apparatus 102, which may be determined based on the measured force and/or angular rate.

In some examples, the sensor 116 may include location detection modules that detect the location or a change of location of the apparatus 102. Examples of the location detection modules may include the Global Positioning System. In other examples, the location detection modules may utilize the sensors described above to sense or determine the location or a change of location. In other examples, the location detection module may include a receiver that receives the location information of the apparatus 102.

The processor 118 interfaces with the camera unit 112, the wireless module 114, and the sensor 116. In some examples, the processor 118 may be or be part of an application processor of the apparatus 102. In some examples, the processor 118 may be implemented on one or several dies. The processor 118 may provide the transmission data to and receive the data from the wireless module 114. The processor 118 may further monitor and receive data from the sensor 116 relating to certain physical characteristics of the apparatus 102, such as data on the location and/or rotation of the apparatus 102.

The processor 118 may include a zoom control 120, which handles various features of the exemplary automatic zoom function described herein. In the example of optical zoom, the zoom control 120 interfaces with the camera unit 112 and may instruct the camera unit 112 to perform the automatic zoom function. In the example of digital zoom, the zoom control 120 may adjust the images captured by the camera unit 112 to achieve the zoom effect. Additional features of the exemplary automatic zoom function are provided below with respect to FIGS. 2-6. These features may be enacted by the processor 118.

Figure 2:
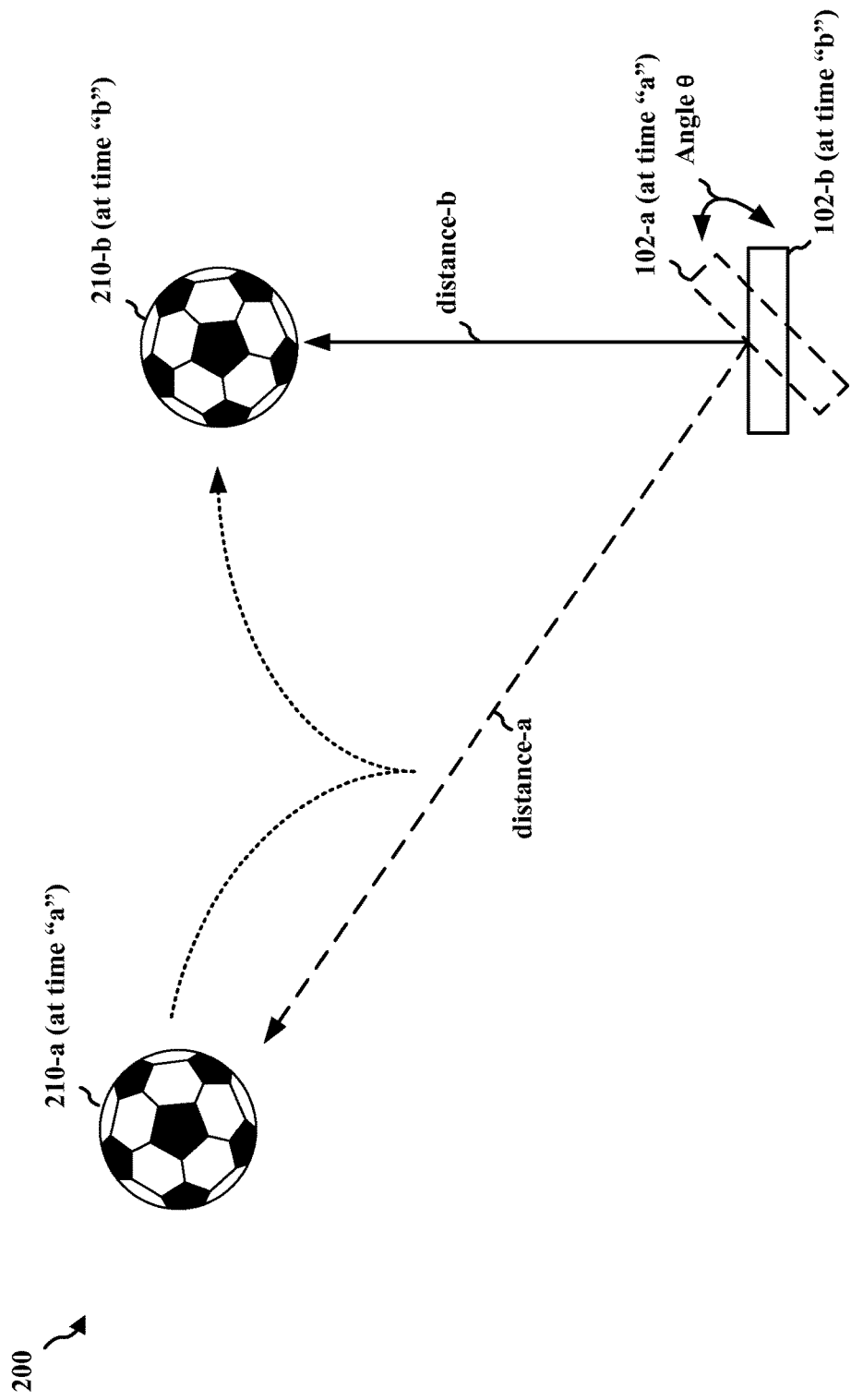
FIG. 2 is a diagram of an application of a camera zoom function performed by the apparatus of FIG. 1.

FIG. 2 is a diagram 200 of an application of a camera zoom function performed by the apparatus 102 of FIG. 1. At time "a," the object 210 (in this example, a bouncing soccer ball and labeled as 210-$a$) is to the left of the apparatus 102 (labeled as 102-$a$) at a distance of distance-a. At time "b," the object (labeled 210-$b$) has bounced nearer to and to the front of the apparatus 102 (labeled 102-$b$). The distance between the object 210-$b$ and the apparatus 102-$b$ is reduced to distance-b. To capture the object 210-$b$, the apparatus 102-$b$ has rotated with the bouncing soccer ball to capture the object 210-$b$. The apparatus 102-$b$ is rotated in reference to the apparatus 102-$a$ at an angle $\theta$.

Accordingly, at time "a," the apparatus 102-$a$ may zoom at a first zoom amount to capture the object 210-$a$. At time "b," the zoom amount may change as the object 210 has moved and the distance between the object 210 and the apparatus 102 has changed. In a case of manual zoom, to capture the images of both objects 210-$a$ and 210-$b$, user inputs would be needed to adjust the zoom amounts. Such user inputs invite poorer image quality and take away from user experience. An automatic, continuous zoom function (e.g., one based on the sensor data detecting the rotation angle $\theta$) would be advantageous.

Accordingly, the apparatus 102 may operate the camera zoom function based on the data from the sensor 116 continuously. In some examples, the apparatus 102 may continue to take the images or video without interruption while the processor 118 performs the zoom adjustment function described above. For example, adjustments to the camera zoom may be performed continuously by the processor 118 without requiring user input, by the processor: a) determining a physical characteristic of the apparatus, e.g., rotation angle $\theta$ based on the data from the sensor 116 at time "a" and at time "b", b) determining a zoom amount for each of time "a" and at time "b" based on the determined physical characteristic, and c) effect the camera zooms at each of time "a" and at time "b" based on the determined zoom amounts. Further details of the exemplary camera zoom function are provided below.

At time "a," in some examples, the processor 118 (e.g., zoom control 120) may determine and adjust the zoom amount at the time "a" based on the location or rotation of the apparatus 102 at time "a." For example, such determination may be based on location or rotation data from the sensor 116 at time "a," and the data may be compared to a reference location or rotation. For example, the reference location may be in reference to an object captured by the apparatus 102 or to a field of view of the apparatus 102. In this example, the processor 118 may effect a zoom out (e.g., via optical zoom or digital zoom) to capture the object 210-$a$ based on the distance-a.

At time "b," the processor 118 (e.g., zoom control 120) may further determine and adjust the zoom amount based on the location or rotation of the apparatus 102 at time "b." In some examples, the location or rotation of the apparatus 102 may be determined from an activity or movement (e.g., rotation) of the apparatus 102 after the time "b." Accordingly, the sensor 116 may detect or sense physical characteristics of the apparatus 102 such as the location, rotation, activity, or movement. The processor 118 may determine and adjust the zoom amount based on such sensor data.

For example, such determination may be based on location or rotation data from the sensor 116 at time "b," and the data may be compared to the reference location or rotation or compared to the location or rotation data at time "a" (that is, treating the location or rotation at time "a" as the reference location or rotation). For example, the processor 118 may determine that the apparatus 102 has rotated by the angle $\theta$ from the time "a" to the time "b," based on the sensor data.

In some examples, the processor 118 may determine or adjust the camera zoom based on image data. For example, the processor 118 may recognize, based on the image data, that the object 210 has moved from the time "a" to the time "b." Using the movement of the object 210 and the rotation of angle $\theta$, the processor 118 may determine that the distance-b is reduced compared to the distance-a. The processor 118 may effect a zoom in (e.g., via optical zoom or digital zoom) to capture the object 210-$b$ at the time "b." As described, the processor 118 may determine the zoom amounts and effect the camera zooms at time "a" and time "b" without requiring user input and thereby, frees the user from such task. Further examples of the utilization of the image data to automate the camera zoom function are provided in FIG. 4 and the associated text.

In some example, the continuous and/or automatic camera zoom based on the data from the sensor 116 may be further adjusted by various factors, including optional user input for further camera zoom adjustment. For example, subsequent to time "b," the processor 118 may receive user input for further camera zoom adjustment. In response, the processor 118 (e.g., zoom control 120) may further adjust the camera zoom subsequent to time "b" based on the received user input.

The continuous and/or automatic adjustment to camera zoom based on the data from the sensor 116 may be further adjusted based on image data. These features are presented in connection with FIG. 4.

The camera zoom adjustments described above may be triggered by various mechanisms. For example, the processor 118 (e.g., zoom control 120) may adjust the zoom amount based on time (e.g., periodically adjusting the zoom amount). In some examples, the processor 118 (e.g., zoom control 120) may adjust the zoom amount triggered by the data from the sensor 116. For example, the processor 118 may adjust the zoom amount based on a change or a change exceeding a threshold in the data from the sensor 116. For example, the processor 118 may adjust the zoom amount in response to a change of the rotation of the apparatus 102 exceeding a threshold angle.

Figure 3:
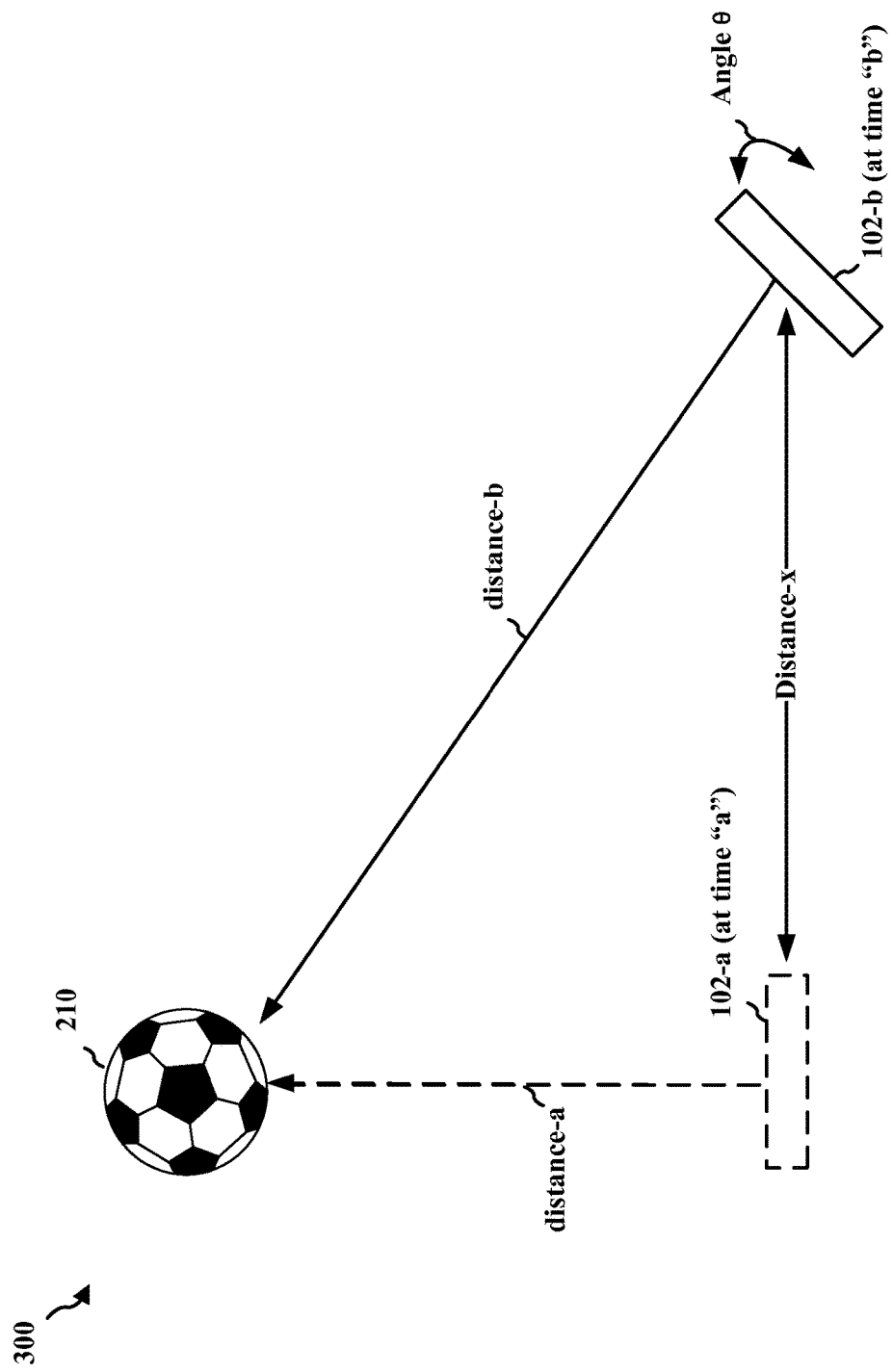
FIG. 3 is a diagram of another application of a camera zoom function performed by the apparatus of FIG. 1.

FIG. 3 is a diagram 300 of another application of a camera zoom function performed by the apparatus 102 of FIG. 1. At time "a," the apparatus 102 (labeled as 102-a) is at a distance of distance-a from the object 210. At time "b," the apparatus 102 (labeled as 102-a) has moved a distance of distance-x away and is at a distance of distance-b from the object 210. The apparatus 102-b rotates at an angle θ in reference to apparatus 102-a.

In this example, the processor 118 (e.g., zoom control 120) may determine and effect the camera zoom at time "a" and the camera zoom at time "b" based on the locations of the apparatus 102. For example, the sensor 116 may include the location detection modules, and the processor 118 may determine and effect the camera zooms based on data from the location detection modules and calibration data that maps location data to zoom amounts. In one example, the processor 118 may utilize the location data (e.g., from the location detection modules) to trigger a determination and a change of the camera zoom. In another example, the processor 118 may utilize the location data and the rotation of the apparatus 102 (angle θ) to determine that a distance to the object has increased or decrease, and to determine and effect the camera zoom based on calibration data that maps measures of increases and decreases in distance to zoom amounts.

Figure 4:
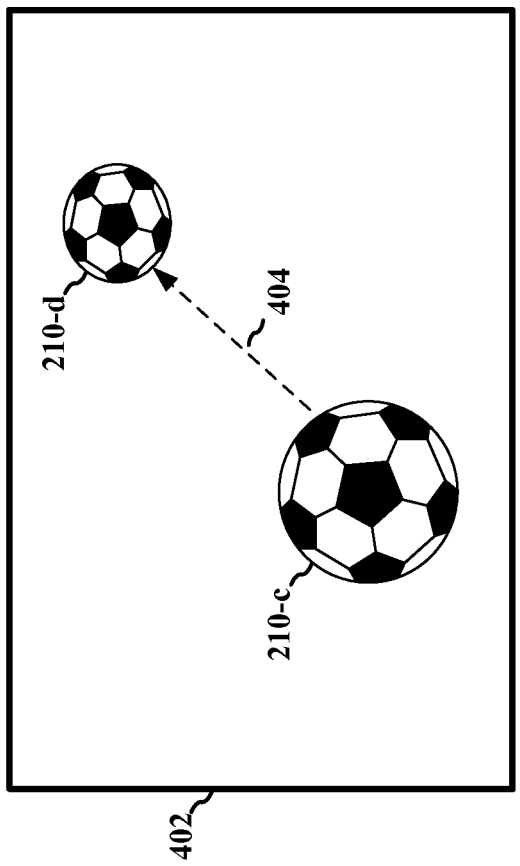
FIG. 4 is a diagram of an image frame captured by the apparatus of FIG. 1, based upon which a camera zoom may be adjusted.

FIG. 4 is a diagram 400 of an image frame 402 captured by the apparatus 102 of FIG. 1, based upon which a camera zoom may be adjusted. For example, the processor 118 (e.g., zoom control 120) may adjust the zoom amount based on the image data within the captured frame. The diagram 400 includes an image or images of an object 210-c at time "c" moving away to object-d at time "d," within the frame 402 (movement 404). In some examples, the processor 118 may adjust the camera zoom based on activity (e.g., movement 404) of the object 210 captured in the image or video frame. For example, the processor 118 may determine that, based on the movement 404, the object 210 is moving away from the apparatus 202, and may increase the zoom amount accordingly. In some examples, the processor 118 may adjust the camera zoom based on a ratio of the size of the object 210 captured in an image or video frame 402 to the size of the frame. For example, the processor 118, at time "d," may determine that the image size of the object 210-d is smaller than the image size of the object-c, as the object 210 has moved away from the apparatus 202. Thus, the ratio of the image size of object 210-d to the size of the frame 402 is reduced from the ratio of the image size of the object 210-c to the size of the frame 402. The processor 118 may adjust (increase) the zoom amount at time "d" to maintain the same ratio of time "a."

Figure 5:
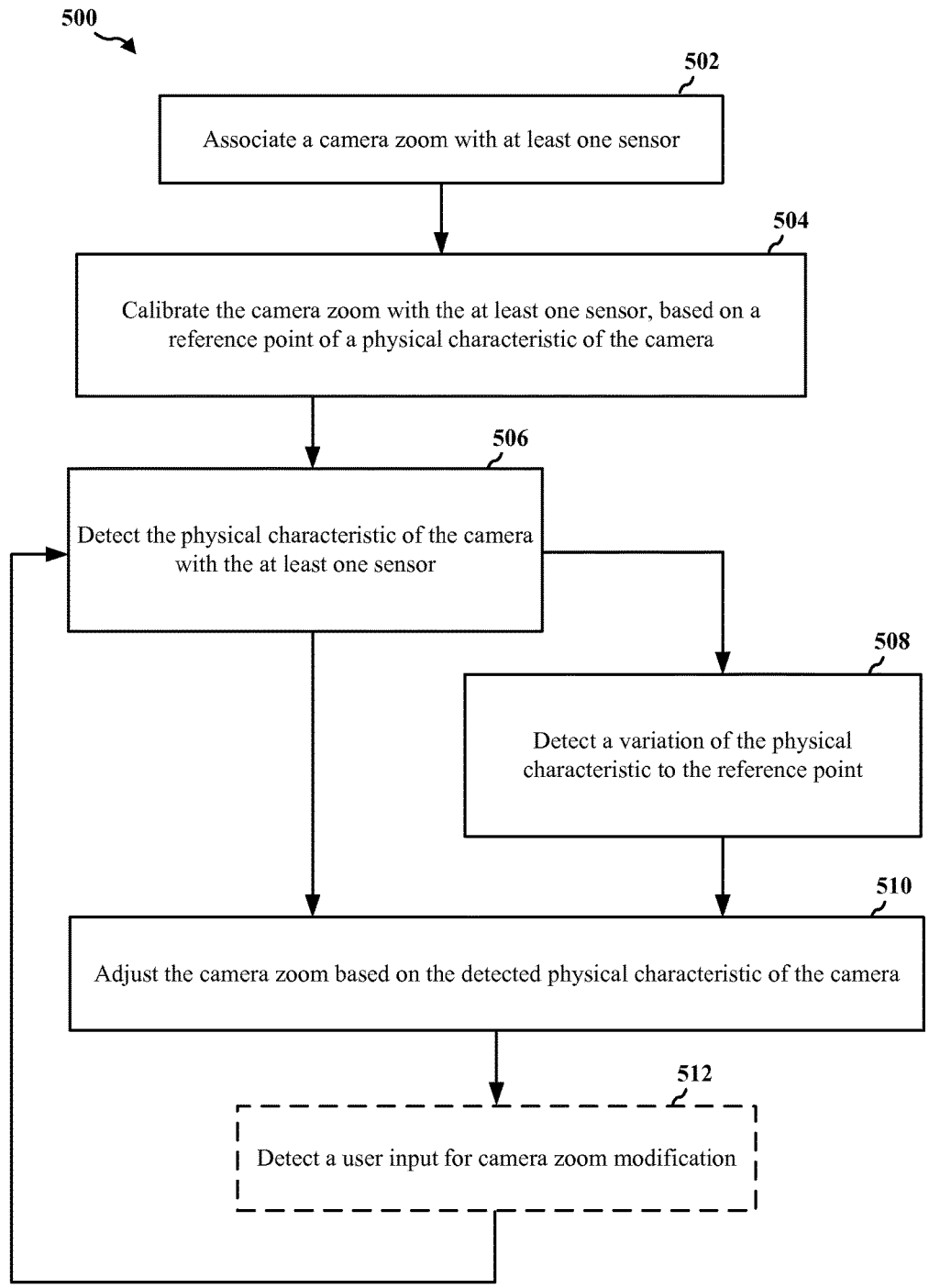
FIG. 5 is a flow chart of an exemplary operation of the camera zoom function based on sensor data operated by the apparatus of FIG. 1.

FIG. 5 is a flow chart 500 of an exemplary operation of the camera zoom function based on sensor data operated by the apparatus 102 of FIG. 1. The flow chart 500 may be performed by, for example, the apparatus 102. Examples of the steps of the flow chart 500 may be found in FIGS. 1-4 and the associated descriptions.

At 502, a camera zoom is associated with at least one sensor. For example, the apparatus may present a user interface through which the user may select the sensor 116 to associate with the camera zoom function. Based in the input received, the apparatus associates the camera zoom with a particular sensor. The selection may be, for example, selecting one of the inertia sensor, the accelerometer, the gyroscope, or the digital compass. In some examples, the association may be preset on the apparatus 102 without the user input.

At 504, the camera zoom is calibrated with the at least one sensor, based on a reference point of the physical characteristic of the camera. Examples of the calibration process may include determining and correlating zoom amounts with zoom settings and physical characteristics of the camera. In some examples, the zoom amount corresponding to the reference point (e.g., the reference location or rotation) of the physical characteristic of the camera may be determined and set as the basis for further zoom adjustments.

For example, the selected sensor 116 may include the gyroscope detecting the rotation (the physical characteristic) of the apparatus 102. In some examples, the reference point of the rotation (the physical characteristic) may be preset or predetermined. Referring to FIG. 2, in some examples, the reference point of the rotation (the physical characteristic) may be the present rotation of the apparatus 102 at time "a."

In some examples, the calibration of the camera zoom may further include predetermining zoom amounts vs. variations to the reference point of the rotation (the physical characteristic). For examples, the zoom amount may be small for small variations, and increase as the variations increase. Such zoom amounts may be set by user input via a user input or predetermined.

At 506, a physical characteristic of the camera is detected with the at least one sensor. Referring to FIG. 2, in some examples, the sensor 116 including the gyroscope detects the rotation of the apparatus 102 at time "a" and at time "b." The processor 118 (e.g., zoom control 120) may monitor the data from the sensor 116. At 508, a variation of the physical characteristic to the reference point is detected. In some examples, the processor 118 (e.g., zoom control 120) may detect a variation of the rotation (the physical characteristic) to the reference point from the monitored data. For example, the processor 118 may detect a variation in the rotation of the apparatus 102 at time "b" to the rotation of the apparatus 102 at time "a" or to a present rotation reference point.

At 510, the camera zoom is adjusted based on the detected physical characteristic of the camera. In some examples, the calibration at 504 predetermines zoom amounts vs. the variations to the rotation reference point. In other words, the calibration may associate, e.g., in a look-up table, an amount by which the camera zoom is either increased or decreased with each of a plurality of different variations of a reference point. The processor 118 (e.g., zoom control 120) may adjust the zoom amount based on the predetermined zoom amounts at 504. For example, the processor 118 may instruct the camera unit 112 to move the camera lenses to achieve the camera zoom in the case of optical zoom, and may adjust the image data to achieve the camera zoom in the case of digital zoom.

In some examples, the processor 118 may further adjust the camera zoom based on image data of the captured object in addition to the detected rotation (the physical characteristic) of the apparatus 102. Referring to FIG. 4, in some examples, the processor 118 may further adjust the camera zoom based on activity (e.g., movement 404) of the object 210 captured in an image or video. In some examples, the processor 118 may adjust the camera zoom based on a ratio of the object 210 captured in an image or video to a size of a frame 402 in the image or video.

In some examples, the processor 118 may continuously detect the physical characteristic (e.g., at 506 or 508) and adjust the camera zoom (e.g., at 510). For example, the apparatus 102 may detect the rotation (the physical characteristic) at time "a" (e.g., at 506 or 508) and adjust the camera zoom accordingly (e.g., at 510) without requiring user input and at the same time taking images or video without interruption. The apparatus 102 may continuously take the images or video from time "a" to time "b," without requiring user input. At time "b," the apparatus 102 may detect the rotation (e.g., at 506 or 508) and adjust the camera zoom accordingly (e.g., at 510) without requiring user input and at the same time taking images or video without interruption.

At 512, a user input for camera zoom modification may be detected. In some examples, the apparatus 102 may further adjust the camera zoom based on optional user inputs. For example, subsequent to time "b," a user of the apparatus 102 may manually adjust the zoom amount via various schemes (e.g., via a slider control on some cameras). The processor 118 (e.g., zoom control 120) may received the optional user inputs for adjusting the zoom amount and adjust the camera zoom accordingly. In some examples, the apparatus 102 may continuously detect the physical characteristic (e.g., at 506 or 508) and adjust the camera zoom accordingly (e.g., at 510) and taking images or video without interruption, which modifying the zoom amount based on the user input.

Figure 6:
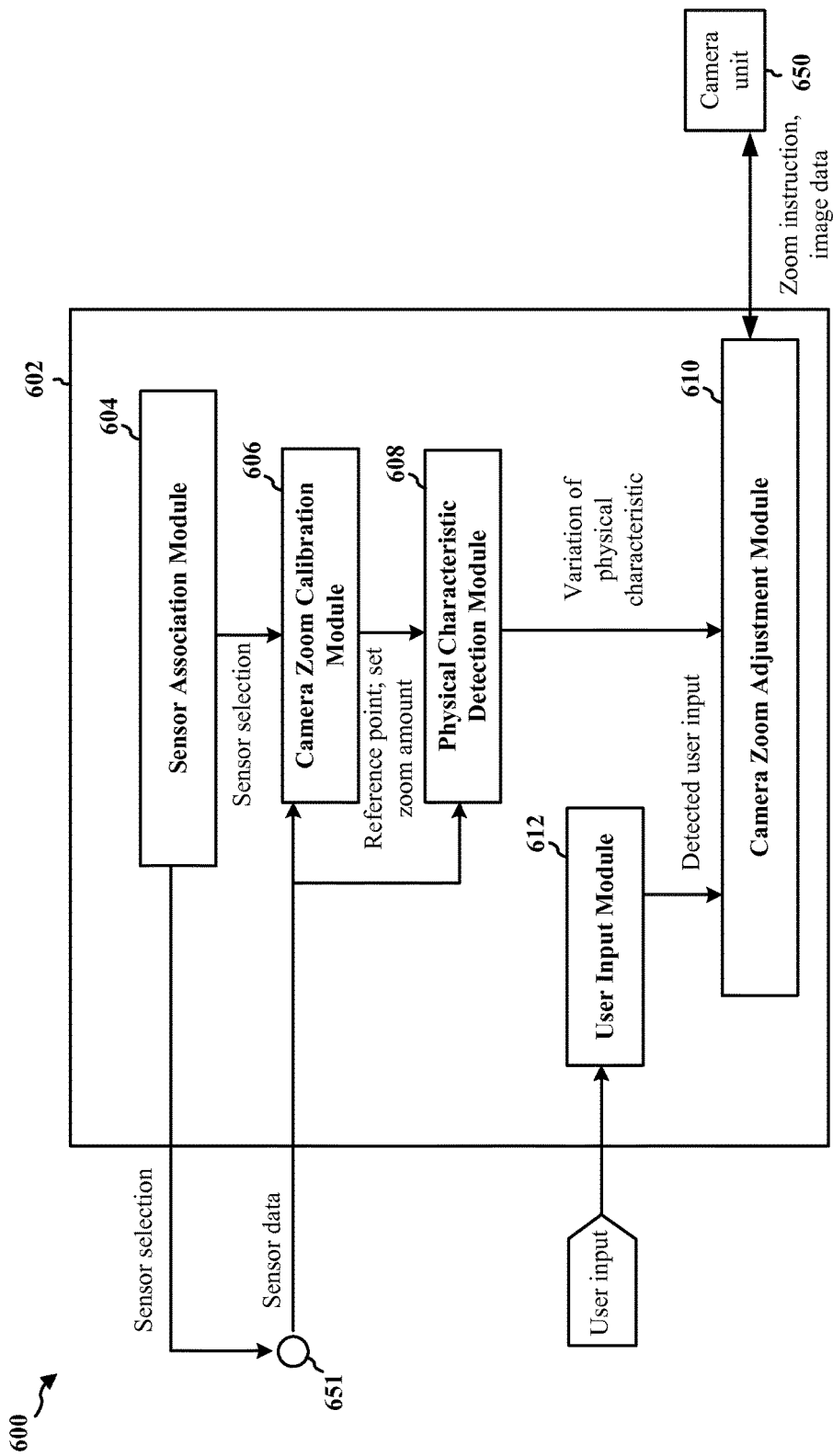
FIG. 6 is a conceptual data flow diagram illustrating the data flow between different modules/means/components in an exemplary apparatus.

FIG. 6 is a conceptual data flow diagram 600 illustrating the data flow between different modules/means/components in an exemplary apparatus 602. The apparatus 602 may be the apparatus 102 described with FIGS. 1-5. In some examples, the apparatus 602 may be the processor 118 (e.g., zoom control 120). The apparatus 602 includes a sensor association module 604, a camera zoom calibration module 606, a physical characteristic detection module 608, a camera zoom adjustment module 610, and a user input module 612. In some examples, the apparatus 602 may include the sensor 651.

The sensor association module 604 associates the sensor 651 with the camera zoom function (e.g., performs the functions associated with step 502). For example, the user may select the sensor 651 to associate with the camera zoom function (e.g., via the user input module 612). The selection may be selecting one of the inertia sensor, the accelerometer, the gyroscope, or the digital compass. In some examples, the association may be preset via the sensor association module 604 without the user input.

The camera zoom calibration module 606 calibrates the zoom function with the selected sensor 651 (e.g., performs the functions associated with step 504). The camera zoom calibration module 606 calibrates the camera zoom function with the sensor 651, based on a reference point of the physical characteristic of the apparatus 602. In some examples, the selected sensor 651 includes the gyroscope detecting the rotation (the physical characteristic) of the apparatus 602. In some examples, the reference point of the rotation (the physical characteristic) may be preset or predetermined. In other examples, such reference point may be set by the user as part of the calibration. In some examples, the camera zoom calibration module 606 may determine a zoom amount based on a variation to the reference point of the rotation (the physical characteristic) and in accordance with a user input (e.g., via the user input module 612).

The physical characteristic detection module 608 detects the physical characteristic of the apparatus 602 with the sensor 651 (e.g., performs functions associated with step 506, 598). Referring to FIG. 2, in some examples, the sensor 116 including the gyroscope detects the rotation of the apparatus 102 at time "a" and at time "b." The physical characteristic detection module 608 monitors the data from the sensor 651. The physical characteristic detection module 608 may further detect a variation of the physical characteristic to the reference point. In some examples, the physical characteristic detection module 608 may detect a variation of the rotation (the physical characteristic) to the reference point from the monitored data.

The user input module 612 receives, in some examples, user inputs for camera zoom adjustments. For example, the user input module 612 may receive user inputs for camera zoom adjustments entered via a zoom slider on a camera. In some examples, the user input module 612 may be used to receive the various user inputs for the sensor association module 604 and the sensor association module 604.

The camera zoom adjustment module 610 adjusts the camera zoom based on the detected physical characteristic (e.g., performs the functions associated with step 510). In some examples, the camera zoom calibration module 606 may determine a zoom amount based on the variation to the rotation reference point. The camera zoom adjustment module 610 may adjust the camera zoom based on the determined zoom amount. For example, the camera zoom adjustment module 610 may instruct the camera unit 650 to move the camera lenses to achieve the camera zoom in the case of optical zoom, and may adjust the image data to achieve the camera zoom in the case of digital zoom. In some examples, the camera zoom adjustment module 610 may be configured to determine movement or activity of an object captured in an image or video and/or a ratio of the object to a size of a frame in the image or video. For example, referring to FIG. 4, the camera zoom adjustment module 610 may determine, from the image data, the movement 404 of the object 210. In some examples, the camera zoom adjustment module 610 may determine the ratio of the size of the object 210 to the size of the frame 402. The camera zoom adjustment module 610 may further adjust the camera zoom based on the movement 404 or the determined ratio.

In some examples, the apparatus 602 may include the sensor 651. The sensor 651 may detect a physical characteristic, such as the location or rotation, of the apparatus 602. Examples of the sensor 651 may accelerometers, gyroscopes, digital compasses, inertia sensors, and location detection modules as described with FIG. 1.

The apparatus may include additional modules that perform each of the blocks of the algorithm in the aforementioned flow chart of FIG. 5. As such, each block in the aforementioned flowchart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 7:
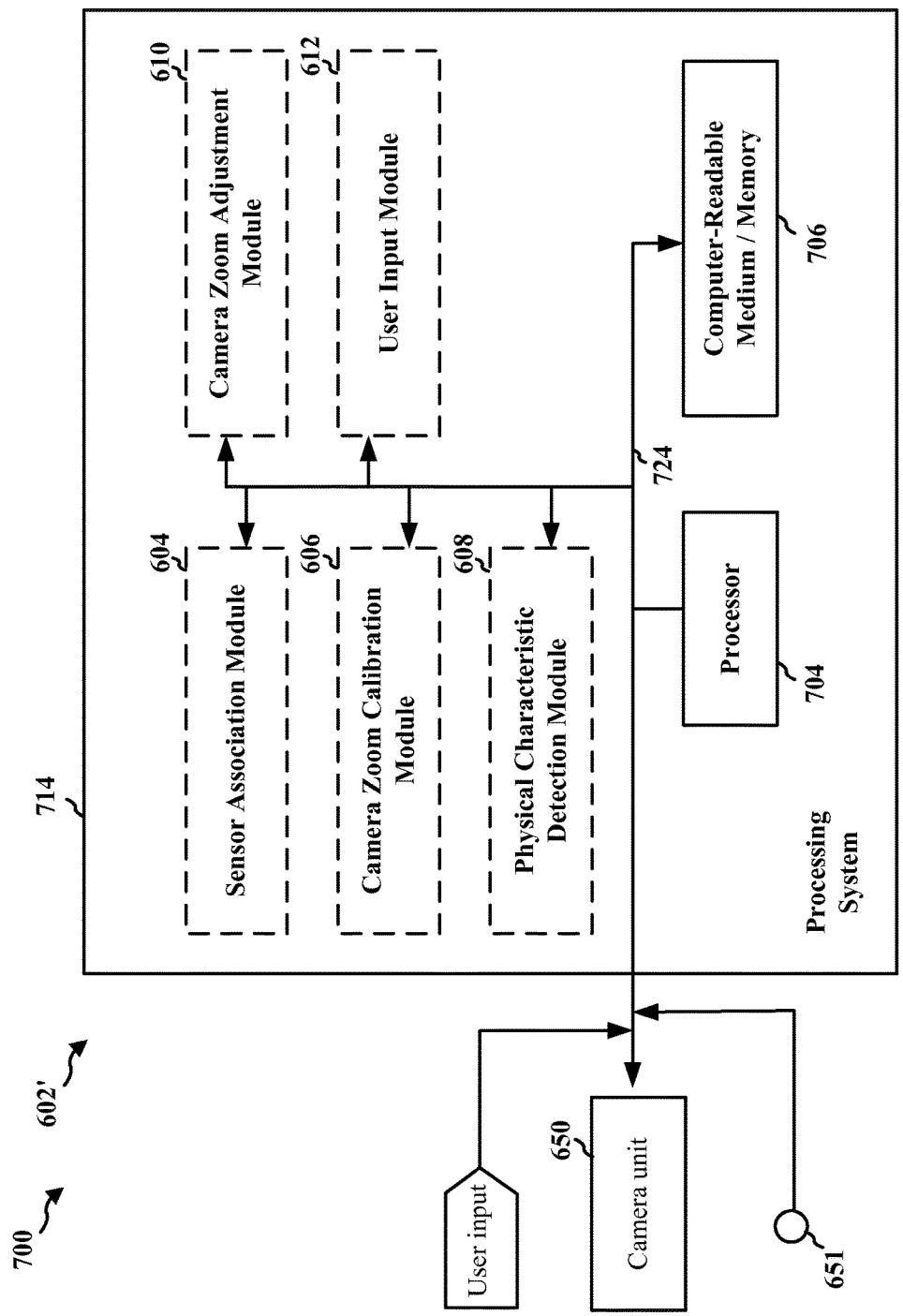
FIG. 7 is a diagram illustrating an example of a hardware implementation for an apparatus employing a processing system.

FIG. 7 is a diagram illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 604, 606, 608, 610, 612, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to the camera unit 650 and the sensor 651. In some examples, the processing system 714 may include the sensor 651. User inputs, camera unit 650, and the sensor 651 may interface with the various modules of the processing system 714 via the bus 724.

The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system further includes at least one of the modules 604, 606, 608, 610, and 612. The modules may be software modules running in the processor 704, resident/stored in the computer readable medium/memory 706, one or more hardware modules coupled to the processor 704, or some combination thereof. The processing system 714 may be a component of the apparatus 102, the processor 118, and/or the zoom control 120.

In one configuration, the apparatus 602/602' may include means for associating a camera zoom of the camera with at least one sensor; means for detecting a physical characteristic of the camera with the at least one sensor; means for adjusting the camera zoom based on the detected physical characteristic of the camera; means for detecting a user input for camera zoom modification; means for calibrating the camera zoom with the at least one sensor, based on the reference point of the physical characteristic of the camera; and means for detecting a variation of the physical characteristic to the reference point. The aforementioned means may be one or more of the aforementioned modules of the apparatus 602 and/or the processing system 714 of the apparatus 602' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of operating a camera, comprising:
   associating a camera zoom with at least one sensor;
   obtaining a reference location and a reference angle of the camera, the reference location and the reference angle of the camera being determined at a previous time for determining a previous zoom amount;
   detecting, with the at least one sensor, a change in a location of the camera and an angle of rotation of the camera relative to the reference location and the reference angle of the camera, the change in the location and the angle being due to a movement of the camera relative to the reference location and the reference angle of the camera, wherein the location is based on a geographical location of the camera; and
   determining a current zoom amount, wherein determining the current zoom amount includes adjusting the camera zoom based on the change in the location and the angle of rotation of the camera and a change in distance to an object, the change in distance to the object being determined using the movement of the camera detected by the sensor and an image of the object captured by the camera.

2. The method of claim 1, wherein detecting the change in the location and the angle of rotation of the camera and adjusting the camera zoom are performed continuously.

3. The method of claim 1, further comprising
   detecting a user input for further camera zoom adjustment, wherein the adjusting the camera zoom is further based on the user input.

4. The method of claim 1, further comprising
   calibrating the camera zoom with the at least one sensor, based on the reference location and the reference angle of the camera.

5. The method of claim 1, wherein the at least one sensor comprises one or more of an inertia sensor, an accelerometer, a gyroscope, a digital compass, or a location detection module configured to detect one or more of the location, the angle of rotation, a change of the location, or a change of the angle of rotation.

6. The method of claim 1, wherein the adjusting the camera zoom is further based on movement of the object captured in the image or video.

7. The method of claim 1, wherein the adjusting the camera zoom is further based on a ratio of the object captured in the image or video to a size of a frame in the image or video.

8. An apparatus, comprising:
a camera;
a memory; and
at least one processor coupled to the memory and configured to:
associate a camera zoom with at least one sensor;
obtaining a reference location and a reference angle of the camera, the reference location and the reference angle of the camera being determined at a previous time for determining a previous zoom amount;
detect, with the at least one sensor, a change in a location of the camera and an angle of rotation of the camera relative to the reference location and the reference angle of the camera, the change in the location and the angle of rotation being due to a movement of the camera relative to the reference location and the reference angle of the camera, wherein the location is based on a geographical location of the camera; and
determining a current zoom amount, wherein determining the current zoom amount includes adjusting the camera zoom based on the change in the location and the angle of rotation of the camera and a change in distance to an object, the change in distance to the object being determined using the movement of the camera detected by the sensor and an image of the object captured by the camera.

9. The apparatus of claim 8, the at least one processor is further configured to detect the change in the location and the angle of rotation of the camera and adjust the camera zoom continuously.

10. The apparatus of claim 8, wherein the at least one processor is further configured to:
detect a user input for further camera zoom adjustment, wherein the camera zoom is adjusted based on the user input.

11. The apparatus of claim 8, wherein the at least one processor is further configured to:
calibrate the camera zoom with the at least one sensor, based on the reference location and the reference angle of the camera.

12. The apparatus of claim 8, wherein the at least one sensor comprises one or more of an inertia sensor, an accelerometer, a gyroscope, a digital compass, or a location detection module configured to detect one or more of the location, the angle of rotation, a change of the location, or a change of the angle of rotation.

13. The apparatus of claim 8, wherein the at least one processor is configured to adjust the camera zoom based on movement of the object captured in the image or video.

14. The apparatus of claim 8, wherein the at least one processor is configured to adjust the camera zoom based on a ratio of the object captured in the image or video to a size of a frame in the image or video.

15. An apparatus, comprising:
a camera;
at least one sensor;
means for associating a camera zoom of the camera with the at least one sensor;
means for obtaining a reference location and a reference angle of the camera, the reference location and the reference angle of the camera being determined at a previous time for determining a previous zoom amount;
wherein the at least one sensor is configured to detect a change in a location of the camera and an angle of rotation of the camera relative to the reference location and the reference angle of the camera, the change in the location and the angle of rotation being due to a movement of the camera relative to the reference location and the reference angle of the camera, wherein the location is based on a geographical location of the camera; and
means for determining a current zoom amount, wherein determining the current zoom amount includes adjusting the camera zoom based on the change in the location and the angle of rotation of the camera and a change in distance to an object, the change in distance to the object being determined using the movement of the camera detected by the sensor and an image of the object captured by the camera.

16. The apparatus of claim 15, wherein the at least one sensor and the means for determining the current zoom amount are configured to operate continuously.

17. The apparatus of claim 15, further comprising:
means for detecting a user input for further camera zoom adjustment, wherein the means for determining the current zoom amount is configured to adjust the camera zoom based on the user input.

18. The apparatus of claim 15, further comprising:
means for calibrating the camera zoom with the at least one sensor, based on the reference location and the reference angle of the camera.

19. The apparatus of claim 15, wherein the at least one sensor comprises one or more of an inertia sensor, an accelerometer, a gyroscope, a digital compass, or a location detection module configured to detect one or more of the location, the angle of rotation, a change of the location, or a change of the angle of rotation.

20. The apparatus of claim 15, wherein the means for determining the current zoom amount is configured to adjust the camera zoom based on movement of the object captured in the image or video.

21. The apparatus of claim 15, wherein the means for determining the current zoom amount is configured to adjust the camera zoom based on a ratio of the object captured in the image or video to a size of a frame in the image or video.

22. A non-transitory computer-readable medium storing computer executable code, comprising code for:
associating a camera zoom of a camera with at least one sensor;
obtaining a reference location and a reference angle of the camera, the reference location and the reference angle of the camera being determined at a previous time for determining a previous zoom amount;
detecting, with the at least one sensor, a change in a location of the camera and an angle of rotation of the camera relative to the reference location and the reference angle of the camera, the change in the location and the angle of rotation being due to a movement of the camera relative to the reference location and the reference angle of the camera, wherein the location is based on a geographical location of the camera; and
determining a current zoom amount, wherein determining the current zoom amount includes adjusting the camera zoom based on the change in the location and the angle of rotation of the camera and a change in distance to an object, the change in distance to the object being determined using the movement of the camera detected by the sensor and an image of the object captured by the camera.

23. The non-transitory computer-readable medium of claim 22, wherein detecting the change in the location and the angle of rotation of the camera and adjusting the camera zoom are performed continuously.

24. The non-transitory computer-readable medium of claim 22, further comprising code for:
   detecting a user input for further camera zoom adjustment, wherein the adjusting the camera zoom is further based on the user input.

* * * * *